(12) United States Patent
O'Lenick, Jr. et al.

(10) Patent No.: US 7,811,976 B1
(45) Date of Patent: Oct. 12, 2010

(54) DIMER ALKYL SILICONE POLYMERS

(76) Inventors: Anthony J. O'Lenick, Jr., 2170 Luke Edwards Rd., Dacula, GA (US) 30091; Kevin A. O'Lenick, 2170 Luke Edwards Rd., Dacula, GA (US) 30091

( * ) Notice: Subject to any disclaimer, the term of this patent is extended or adjusted under 35 U.S.C. 154(b) by 0 days.

(21) Appl. No.: 12/384,682

(22) Filed: Apr. 9, 2009

Related U.S. Application Data

(60) Provisional application No. 61/207,446, filed on Feb. 13, 2009.

(51) Int. Cl.
*C08G 77/06* (2006.01)

(52) U.S. Cl. .......................... 508/207; 528/15; 528/25; 528/31; 508/202; 508/208; 428/447

(58) Field of Classification Search .................... 528/15
See application file for complete search history.

(56) References Cited

U.S. PATENT DOCUMENTS 5,288,432 A   2/1994  Jung
6,262,170 B1 * 7/2001  Kilgour et al. .............. 524/731

* cited by examiner

*Primary Examiner*—Marc S Zimmer
*Assistant Examiner*—Lindsay Nelson

(57) ABSTRACT

This invention relates to a novel class of Dimer Alkyl Silicone Polymers (DASP) and their use to reduce surface tension of lubrication oil. The improved lubricant composition based upon a very specific class of dimer alkyl silicone polymers (DASP) that despite their solubility in oil lower surface tension and improve lubrication when added at low concentrations to lubricating oils.

7 Claims, No Drawings

DIMER ALKYL SILICONE POLYMERS

CLAIM OF BENEFIT TO PROVISIONAL APPLICATION

This patent application claims the benefit of the earlier field U.S. Provisional Patent Application entitled "Dimer Alkyl Silicone Polymers", having Ser. No. 61/207,446 and filed Feb. 13, 2009.

FEDERAL SPONSORSHIP

There is no federal sponsorship on the present invention.

FIELD OF THE INVENTION

This invention relates to a novel class of Dimer Alkyl Silicone Polymers (DASP) and their use to reduce surface tension of lubrication oil. The improved lubricant composition based upon a very specific class of dimer alkyl silicone polymers (DASP) that despite their solubility in oil lower surface tension and improve lubrication when added at low concentrations to lubricating oils.

This invention is a method of lubricating not only metal but also more specifically internal combustion engines operating at very high temperatures using dimer alkyl silicone polymers (DASP).

This invention relates to new synthetic lubricant compositions having exceptionally low surface tension.

BACKGROUND OF THE INVENTION

The DASP of the present invention are used in both regular and synthetic lubricants, where they lower surface tension from 30 dynes/cm$^2$ to below 25 dynes/cm$^2$ at concentrations of less than 5% by weight.

Defining the term "synthetic lubricant" in general it refers to a lubricant or grease whose basestock has been manufactured by chemical synthesis or organic reaction, as opposed to being extracted or refined from naturally occurring oils. In many respects synthetics represent a different approach altogether from conventional petroleum based oils in that their molecular structures are custom designed and tailored to meet specific performance targets.

Most lubricants consist of a basestock and various additives selected to improve or supplement the basestock's performance. The basestock is the primary component, usually 70 to 99% of the finished oil and its properties play a vital role. To a great degree the structure and stability of the basestock dictate the flow characteristics of the oil and the temperature range in which it can operate, as well as many other vital properties such as volatility, lubricity, and cleanliness. Additives enhance these properties or impart new ones, such as improving stability at both high and low temperatures, modifying the flow properties, and reducing wear, friction, rust and corrosion. The basestock's and additives work together and must be carefully selected and balanced to allow the finished oil to do its intended job, which includes protecting moving parts from wear, removing heat and dirt, preventing rust and corrosion, and improving energy efficiency. Since the basestock is the dominate component with the most important role, one obvious way to make a better oil is to start with a better basestock. That is exactly what synthetic oils endeavor to accomplish.

Conventional petroleum basestocks or mineral oils begin with crude oil, a mixture of literally hundreds of different molecules derived from the decomposition of prehistoric plant and animal life. The lighter more volatile components of crude oil are stripped away to make gasoline and other fuels, and the heaviest components are used in asphalt and tar. It's the middle cuts that have the right thickness or viscosity for lubricants, but first they must be cleaned up; undesirable components such as waxes, unsaturated hydrocarbons, and nitrogen and sulfur compounds must be removed. Modern processing techniques do a pretty good job of removing these undesirable components, well enough for well over 95% of the world's lubricant applications, but they cannot remove all of the bad actors. And it's these residual "weak links" that limit the capabilities of mineral oils, usually by triggering breakdown reactions at high temperatures or freezing up when cold. These inherent weaknesses limit the temperature range in which mineral oils can be used and shorten the useful life of the finished lubricant.

Synthetic basestocks, on the other hand, start from relatively pure and simple chemical building blocks, which are then reacted together or synthesized into new, larger molecules. In fact the entire formulation approach is different: instead of trying to clean up a naturally occurring chemical soup to acceptable levels with a constant eye on cost, the synthetic molecular engineer is able to focus on optimum performance in a specific application with the knowledge that he can build the necessary molecules to achieve it. Since synthetics cost considerably more than petroleum based basestocks, they are generally reserved for problem applications where conventional oils fail, or where the efficiency benefits of synthetics recoup the initial cost.

The use of synthetic basestocks to solve lubrication problems is not new. Various synthetics were developed and used extensively during the second world war to prevent the oil from freezing in the army tanks during winter combat. After the war, synthetics were found to be essential for the new jet engines which ran too hot for mineral oils, causing them to burn off rapidly and leave deposits. These jet engines also had to be able to restart at high altitudes where temperatures were often −50° F., so the oil had to pumpable at very low temperatures as well as surviving the searing temperatures within the engine. Indeed the modern jet engine would not exist today if not for the simultaneous development of synthetic basestock technology in the 1950s, and today virtually every jet engine in the world operates exclusively on synthetic lubricants.

During the 1960s and 70s, synthetics moved steadily into severe industrial applications where they solved high temperature deposit problems with air compressors and oven conveyor chains, and low temperature flow problems in arctic climates.

Synthetic automobile motor oils were introduced in the early 1970s with such fantastic performance claims that they initially turned the auto manufacturers and oil companies against the new unproven products. While most claims were directionally valid, the levels of improvements are exaggerated to the point of fostering a "snake oil" reputation. Over the ensuing years, the true benefits of synthetic motor oils were identified and quantified to industry satisfaction and include better high temperature stability, excellent low temperature flow characteristics, lower volatility, increased fuel efficiency, and extended life capability. Today car manufacturers and oil companies alike readily acknowledge the superior performance of synthetic motor and gear oils, especially in fleet or severe duty usage.

Today the use of synthetic lubricants is accepted, widespread, and rapidly growing as their capability and cost efficiency benefits become better known worldwide. Jet aircraft use synthetic oils in the engines, hydraulic systems, instruments and landing gears; compressors use synthetics in the crankcase and cylinders; refrigeration systems use synthetics with the new environmentally friendly refrigerants; truck fleets use synthetics in the engine, transmission, and gear box; and the list goes on and on. Wherever a problem exists with mineral oils or a potential for improved cost efficiency uncovered, there is a synthetic lubricant ready and able to step in and lower the cost of total lubrication.

Some properties are inherent in the class, such as high temperature thermal and oxidative stability, low volatility, high flash and fire points, and low temperature fluidity. Others can be varied according to need such as biodegradability, lubricity, hydrolytic stability, viscosity index, and coking tendencies. Esters are more and more commonly used in synthetic lubricants, but can degrade as a function of temperature. This degradation results in several oxidation products which accelerate the rate of degradation. The beginning of degradation is in fact a catalyst in the rapid degradation.

Additionally, the ability to lower surface tension of the lubricant below 30 dynes/cm$^2$ has been elusive since organic materials from which they are based have this value as the lower limit of surface tension achievable. Lower surface tension makes for better lubrication, and slip of metal parts, resulting in improved lubrication. Improved lubrication results in lower operating temperatures and improved miles per gallon.

Lower surface tension can only be achieved by using dimethyl silicones (also known as silicone fluids), but these polymers are not soluble in oil bases and have not been used. The present invention relates to including two very key groups on the silicone polymer, the first an alkyl group, improving the solubility of the silicone in oil, and also a very limited crosslink density that despite clarity in the oil results in the lowest free energy of the oil to be when the silicone polymer is pushed to the oil metal interface, where it surprisingly lowers surface tension.

PAOs (poly alpha olefins) have been used as additives to lubrication oils, but due to PAOs lower cost and their formulating similarities to mineral oil. However these materials do not lower surface tension below the critical 30 dynes/cm$^2$.

The new frontier for lubricants is the industrial marketplace where the number of products, applications, and operating conditions is enormous. In many cases, the very same equipment, which operates satisfactorily on typical oil in one plant could benefit greatly from the use of a DASP modified lubricant in another plant where the equipment is operated under more severe conditions. This is a marketplace where old problems or new challenges can arise at any time or any location. The high performance properties and custom design versatility of DASP lubricants is ideally suited to solve these problems. Lubricants based upon DASP have niches in the industrial market such as reciprocating air compressors and high temperature industrial oven chain lubricants.

The ability of the DASP molecules to get to the surface, and lower surface tension causes the molecules tend to line up on the metal surface creating a film which requires additional energy (load) to penetrate. The result is a stronger film which translates into higher lubricity and lower energy consumption in lubricant applications.

The structure of the DASP makes them good solvents and dispersants. This allows them to solubilize or disperse oil degradation by-products, which might otherwise be deposited as varnish or sludge, and translates into cleaner operation and improved additive solubility in the final lubricant.

Another important difference between esters and PAOs is the incredible versatility in the design of DASP molecules due to the ability to tailor molecules. The performance properties that can be varied to include viscosity, viscosity index, volatility, high temperature coking tendencies, biodegradability, lubricity, hydrolytic stability, additive solubility, and seal compatibility.

DASP molecules unlike other esters used in synlube applications, do not tend to swell and soften most elastomer seals, solving a major problem.

U.S. Pat. Nos. 2,396,191; 2,936,320; 3,021,357; 3,637,501; 3,912,640; and 4,080,303 are illustrative of prior art attempts to formulate lubricants containing esters of aromatic polycarboxylic acids.

U.S. Pat. No. 3,637,501 describes neo-carbon containing polycarboxylic acid esters wherein the ester groups on the aromatic nucleus contain at least one carbon atom connected directly to four other carbon atoms.

U.S. Pat. No. 5,288,432 to Jung issued Feb. 22, 1994, incorporated herein by reference teaches high temperature synthetic lubricants and related engine lubricating systems. These high temperature lubricant composition comprise a polycarboxylic acid esters and organophosphorus compounds is described. This composition is useful for lubricating very high temperature diesel engines. A method of rectifying used lubricant compositions is also described.

The number of lubricant patents and the continued research on such materials is a testimony to the severity of the problem and the long felt need for improvement. The lack of silicone polymers used to address the shortcomings of oil based materials shows that one of ordinary skill in the lubricating art would not look to silicones to solve these problems. This is do the inherent insolubility of all silicones that are not made following the teachings of this invention to be soluble in base stock and the inability to achieve the desired surface tension reduction.

DASP are most useful for high temperature lubricant applications. Moreover, we considered them superior in thermal properties, providing the best balance of high temperature stability and lubrication performance.

THE INVENTION

Summary of the Invention

The present invention discloses a series of dimer alkyl silicone polymers (DASP) and a process for their use in lubricating. We have surprisingly found that molecules of the present invention, by virtue of their structure lower the surface tension of oil based lubricants and improve the efficiency of the lubricants.

Detailed Description of the Invention

The present invention is also directed to a compound conforming to the following structure:

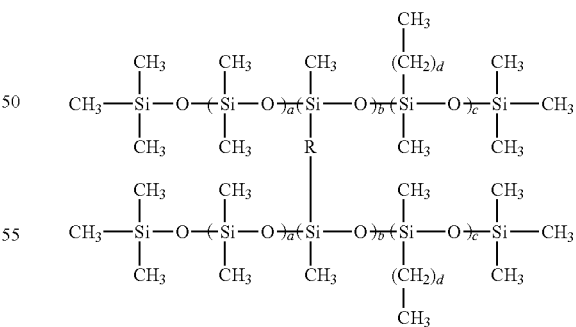

wherein:
a is an integer ranging from 1 to 200;
b is 1;
c is an integer ranging from 1 to 20;
d is an integer ranging from 11 to 15;

with the proviso that the ratio of c to a ranges from 1:1 to 1:10;

R is

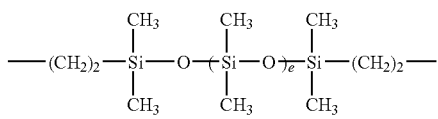

e is an integer ranging from 0 to 100.

The present invention is also directed to a process for lubricating metal which comprises contacting the metal with an effective lubrication concentration of a compound conforming to the following structure:

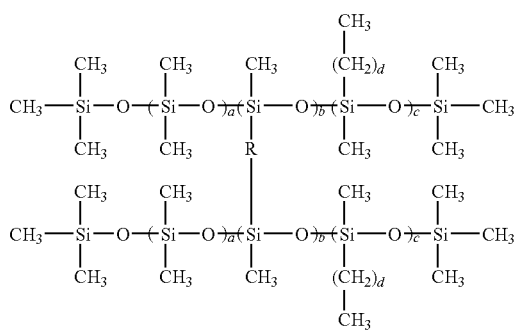

wherein:
a is an integer ranging from 1 to 200;
b is 1;
c is an integer ranging from 1 to 20;
d is an integer ranging from 11 to 15;

with the proviso that the ratio of c to a ranges from 1:1 to 1:10;
R is

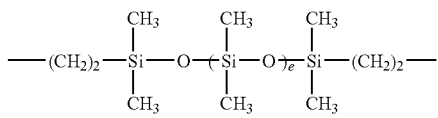

c is an integer ranging from 0 to 100.

The range of the a, b, c, d and e values are all critical to functionality. The value of "a" determines the amount of silicone nature in the molecule which critically effects surface tension. Too low the surface tension is not reduced, too high the material becomes insoluble in the oil base.

The value of "b" critically effects the viscosity and solubility of the material in oils. As the value of "b" is increased to 2 or 3 a hard gel results. Not wanting to be held to any one theory we believe the formation of the prescribes dimer (that is di product) results in a molecule that is large enough to be driven to the metal oil surface and small enough to be soluble.

The value of "c" determines the solubility of the DASP in the oil.

The value of "e" determines the viscosity of the DASP. Below 11, there is minimal solubility, above 15 the molecules become solid and destroy the lubrication.

The ranges of the values for a relative to b relative to c relative to d, keep the molecule in balance, providing the balance between surface tension reduction and solubility.

Preferred Embodiment

In a preferred embodiment d is 11.
In a preferred embodiment d is 15.
In a preferred embodiment the ratio of a to c ranges from 1:1 to 1:5.
In a preferred embodiment the ratio of a to c is 1:4.
In a preferred embodiment the ratio of a to c is 1:3.

EXAMPLES

Silanic Hydrogen Compounds

The silanic hydrogen compounds of the present invention conform to the following structure and are available from Siltech LLC sold under the Silmer® H trade name.

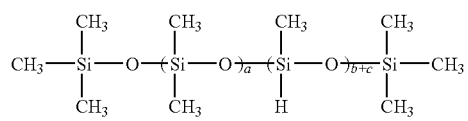

b+c is an integer ranging from 2 to 21;

a is an integer ranging from 1 to 20;

with the proviso that the ratio of c to a ranges from 1:1 to 1:10;

| Example | b + c | a | Ratio a:c |
|---------|-------|-----|-----------|
| 1 | 2 | 1 | 1:1 |
| 2 | 9 | 32 | 1:4 |
| 3 | 11 | 50 | 1:5 |
| 4 | 16 | 150 | 1:10 |
| 5 | 21 | 160 | 1:8 |

Vinyl Crosslinkers

Vinyl crosslinkers are items of commerce available from Siltech LLC sold under the trade name Silmer® VIN. They conform to the following structure:

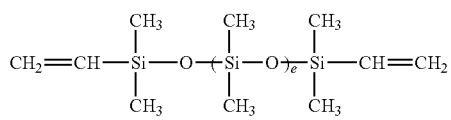

e is an integer ranging from 0 to 100.

| Example | e |
|---------|-----|
| 6 | 100 |
| 7 | 75 |
| 8 | 50 |
| 9 | 25 |
| 10 | 10 |

Alpha Olefin

Alpha olefins are items of commerce. They are available from a variety of sources including Chevron. They conform to the following structure:

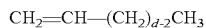

d is an integer ranging from 11 to 15;

| Example | d |
|---------|----|
| 11 | 11 |
| 12 | 13 |
| 13 | 15 |

Hydrosilylation

Hydrosilylation is a process that reacts terminal vinyl compounds with silanic hydrogen to obtain a Si—C bond. References to this reaction, incorporated herein by reference, include:

U.S. Pat. Nos. 3,715,334 and 3,775,452 to Karstedt, shows the use of Pt(O) complex with vinylsilicon siloxane ligands as an active hydrosilylation catalyst.

Additional platinum complexes, such as complexes with platinum halides are shown by, U.S. Pat. No. 3,159,601 Ashby and, U.S. Pat. No. 3,220,972, to Lamoreaux.

Another hydrosilylation catalyst is shown by Fish, U.S. Pat. No. 3,576,027. Fish prepares a platinum(IV) catalyst by reacting crystalline platinum(IV) chloroplatinic acid and organic silane or siloxane to form a stable reactive platinum hydrosilylation catalyst.

General Procedure

To the specified number of grams of the specified silanic hydrogen compound (Examples 1-5) is added the specified number of grams of the specified vinyl compound (Example 6-10). The mass is mixed well. To that mixture is added 0.1% Karstedt catalyst, which is commercially available from Geleste. The agitation is stopped and the reaction begins. The reaction is held at 80° C. for one hour. To that mixture is added the specified number of grams of the specified alpha olefin (Example 11-13). The reaction is held at 80° C. for 4 hours. The product is used without purification.

Examples 14-23

| Ex- ample | Silanic Hydrogen Example | Grams | Vinyl Compound Example | Grams | Alpha Olefin Example | Grams |
|-----------|--------------------------|-------|------------------------|-------|----------------------|-------|
| 14 | 1 | 358 | 6 | 3794 | 11 | 168 |
| 15 | 2 | 307 | 7 | 267 | 12 | 627 |
| 16 | 3 | 452 | 8 | 194 | 13 | 1120 |
| 17 | 4 | 122 | 9 | 111 | 11 | 2520 |
| 18 | 5 | 1272 | 10 | 47 | 12 | 3136 |
| 19 | 1 | 354 | 10 | 464 | 13 | 224 |
| 20 | 2 | 307 | 9 | 111 | 13 | 707 |
| 21 | 3 | 452 | 8 | 194 | 12 | 980 |
| 22 | 4 | 127 | 7 | 287 | 11 | 2820 |
| 23 | 5 | 1272 | 6 | 379 | 13 | 258 |

The compounds so prepared are clear liquids and are added to a variety of oils to lower surface tension.

Surface Tension Reduction

The surface/interfacial tension was made using the use of a torsion balance known as the DuNouy instrument (tensiometer), described in ASTM D971:99a and ASTM D1331. It measures the force required to lift a horizontal platinum wire ring away from the oil's surface is measured either directly (surface tension). The unit of measure for surface tension is dynes per centimeter (equal to mN/m).

The surface tension of 1, 3 and 5% of the following compounds was measured by adding the DASP to Mobil 1 (MOB) synthetic and Pennzoil standard 10W30 motor oil (PENN) only if they were clear upon the addition (that is soluble).

Compounds of the Present Invention

| Surface Tension | 5% PENN mN/m | 5% MOB mN/m | 1% PENN mN/m | 1% MOB mN/m |
|-----------------|--------------|-------------|--------------|-------------|
| Example 15 | 22.114 | 22.043 | 22.349 | 22.030 |
| Example 20 | 23.112 | 23.011 | 23.456 | 23.056 |
| Example 22 | 24.116 | 24.016 | 24.390 | 24.111 |

Compounds not of the Present Invention

| Surface Tension | 5% PENN mN/m | 5% MOB mN/m | 1% PENN mN/m | 1% MOB mN/m |
|-----------------|--------------|-------------|--------------|-------------|
| Octyl dimethicone | 29.460 | 29.227 | 29.276 | 29.295 |
| Cetyl Dimethicone | 29.285 | 29.053 | 29.906 | 29.727 |
| Stearyl dimethicone | Solid | Solid | Solid | Solid |
| Lauryl Dimethicone | 30.297 | 30.027 | 30.871 | 30.630 |
| 350 Visc Silicone Fluid | Not sol | Not Sol | Not Sol | Not Sol |
| 50 Visc silicone fluid | Not Sol | Not Sol | Not Sol | Not Sol |

| | PENN | MOB |
|---|------|-----|
| Control (no additive) | 31.116 | 30.886 |

THE ENGINE LUBRICATING METHOD OF THE INVENTION

This invention is an improved method of lubricating internal combustion engines at by contacting the moving parts of the engine with the novel lubricant esters of this invention. Any conventional contacting method such as injecting, spraying, dipping, brushing, or padding may be employed. Typical practice of the invention is to lubricate ferrous alloys although other metals such as aluminum or non-metals such as ceramics may be successfully lubricated.

The lubricant of the invention has significant application for use with advanced design internal combustion engines, particularly diesel engines. Advanced diesel engines which are uncooled or insulated benefit from the lubricant and lubrication method disclosed herein.

The process of lubrication is accomplished by inserting a thin film of the lubricant of the invention between any contacting surfaces desired to be lubricated. Application of the lubricant may be by dripping, spraying, injecting, padding or other conventional means.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth hereinabove but rather that the claim be construed as encompassing all the features of patentable novelty which reside in the present invention, including all features which would be treated as equivalents thereof by those skilled in the art to which the invention pertains.

What is claimed is:

1. A dimer alkyl silicone polymer conforming to the following structure:

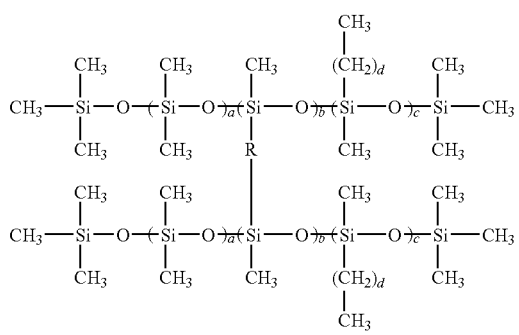

wherein:
a is an integer ranging from 1 to 200;
b is 1;
c is an integer ranging from 1 to 20;
d is an integer ranging from 11 to 15;
with the proviso that the ratio of a to c ranges from 1:1 to 10:1;
R is

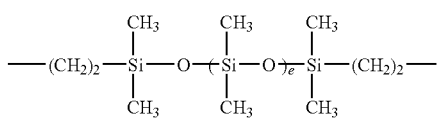

e is an integer ranging from 0 to 100.

2. A dimer alkyl silicone polymer of claim 1 wherein d is 11.

3. A dimer alkyl silicone polymer of claim 1 wherein d is 15.

4. A dimer alkyl silicone polymer of claim 1 wherein c to a ranges from 1:1 to 1:5.

5. A dimer alkyl silicone polymer of claim 1 wherein c to a is 1:4.

6. A dimer alkyl silicon polymer of claim 1 wherein c to a is 1:3.

7. A process for lubricating metal which comprises contacting the metal with an effective lubrication concentration of a compound conforming to the following structure:

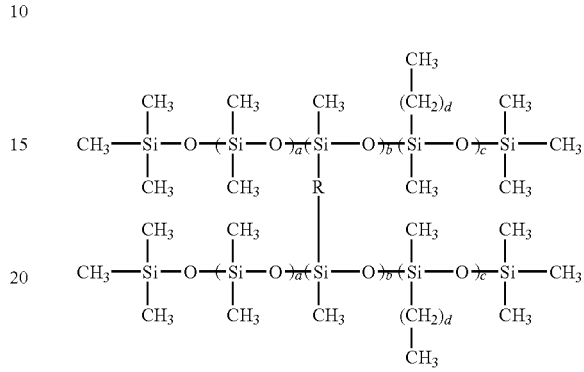

wherein:
a is an integer ranging from 1 to 200;
b is 1;
c is an integer ranging from 1 to 20;
d is an integer ranging from 11 to 15;
with the proviso that the ratio of a to c ranges from 1:1 to 1:10;
R is

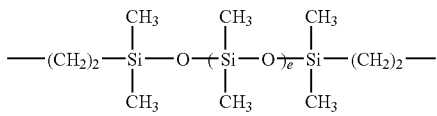

e is an integer ranging from 0 to 100.

* * * * *